US011019162B2

(12) United States Patent
Knoppert et al.

(10) Patent No.: US 11,019,162 B2
(45) Date of Patent: May 25, 2021

(54) SYSTEM AND METHOD FOR PROVISIONING A USER INTERFACE FOR SHARING

(71) Applicant: Dell Products L.P., Round Rock, TX (US)

(72) Inventors: Michiel Knoppert, Amsterdam (NL); Deeder Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 432 days.

(21) Appl. No.: 15/353,566

(22) Filed: Nov. 16, 2016

(65) Prior Publication Data

US 2018/0136824 A1 May 17, 2018

(51) Int. Cl.
| | | |
|---|---|---|
| *H04L 29/08* | (2006.01) | |
| *G06F 3/01* | (2006.01) | |
| *G06F 3/16* | (2006.01) | |
| *G06F 3/0488* | (2013.01) | |
| *G06K 9/00* | (2006.01) | |

(Continued)

(52) U.S. Cl.
CPC .............. *H04L 67/22* (2013.01); *G06F 3/011* (2013.01); *G06F 3/017* (2013.01); *G06F 3/04883* (2013.01); *G06F 3/167* (2013.01); *G06K 9/00369* (2013.01); *G06K 9/00892* (2013.01); *H04L 67/025* (2013.01); *H04L 67/36* (2013.01); *H04N 7/147* (2013.01); *H04N 7/15* (2013.01); *G06F 2203/04808* (2013.01)

(58) Field of Classification Search
CPC ....... H04L 67/22; H04L 67/025; H04L 67/36; G06K 9/00369; G06K 9/00892; H04N 7/147; H04N 7/15; G06F 3/04883; G06F 3/011; G06F 3/167; G06F 3/017; G06F 2203/04808
See application file for complete search history.

(56) References Cited

U.S. PATENT DOCUMENTS 8,669,845 B1 * 3/2014 Chakraborty .......... G06Q 50/00
235/440
9,633,352 B2 * 4/2017 Henderson ......... G06Q 20/4014
(Continued)

OTHER PUBLICATIONS

Mark R. Mine et al., "Moving Objects In Space: Exploiting Proprioception In Virtual-Environment Interaction" Proceedings of SIGGRAPH'97. 1997. ACM. pp. 19-26, Jun. 19, 1905.
(Continued)

*Primary Examiner* — Ryan F Pitaro
(74) *Attorney, Agent, or Firm* — Baker Botts L.L.P.

(57) ABSTRACT

Methods and systems for tracking and sharing user data may include presenting a first portion of content to a first user, detecting the first user and second user in proximity to an information handling system, displaying a user interface element associated with the content on the information handling system, sharing the user interface element with the second user using the information handling system, and presenting a second portion of content on the second information handling system to the second user. The content associated with a user interface element. The display may be based on the detection of the first user. The sharing may be based on a gesture received from the first user. The second portion of the content includes the first portion of content and another portion of content.

17 Claims, 9 Drawing Sheets

(51) Int. Cl.
*H04N 7/14* (2006.01)
*H04N 7/15* (2006.01)

(56) References Cited

U.S. PATENT DOCUMENTS

| | | | | |
|---|---|---|---|---|
| 9,672,549 B2* | 6/2017 | Vernick | G06Q 30/0281 |
| 9,978,178 B1* | 5/2018 | Shepard | G06F 3/00 |
| 10,101,831 B1* | 10/2018 | Dand | G06F 3/1423 |
| 10,230,804 B2* | 3/2019 | Guo | H04L 67/22 |
| 10,237,329 B1* | 3/2019 | Pillai | H04W 4/029 |
| 2007/0016475 A1* | 1/2007 | Calmenson | G06Q 30/0224 705/14.19 |
| 2007/0079249 A1* | 4/2007 | Pall | G06F 9/543 715/758 |
| 2008/0167913 A1* | 7/2008 | Wiswell | G06F 16/9535 705/14.54 |
| 2008/0192059 A1* | 8/2008 | Kennedy | G06F 3/0488 345/537 |
| 2009/0091539 A1* | 4/2009 | Do | G06F 3/04886 345/173 |
| 2009/0094515 A1* | 4/2009 | Do | G06F 3/04886 715/273 |
| 2009/0094561 A1* | 4/2009 | Do | G06F 3/0425 715/863 |
| 2009/0109180 A1* | 4/2009 | Do | G06F 3/0416 345/173 |
| 2009/0309846 A1* | 12/2009 | Trachtenberg | G06F 3/017 345/173 |
| 2010/0079414 A1* | 4/2010 | Ferlitsch | G06F 3/0421 345/179 |
| 2010/0107219 A1* | 4/2010 | Thompson | G06F 21/6218 726/2 |
| 2010/0218249 A1* | 8/2010 | Wilson | H04L 63/0861 726/19 |
| 2011/0080426 A1* | 4/2011 | Nakamori | G06F 21/6218 345/634 |
| 2012/0029691 A1* | 2/2012 | Mockus | G07F 9/023 700/232 |
| 2013/0065526 A1* | 3/2013 | Pottier | H04W 4/80 455/41.2 |
| 2013/0069983 A1* | 3/2013 | Rakshit | G06F 16/5866 345/629 |
| 2013/0286223 A1* | 10/2013 | Latta | H04N 1/00347 348/207.1 |
| 2013/0311935 A1* | 11/2013 | Setlur | G06F 1/1694 715/781 |
| 2014/0075464 A1* | 3/2014 | McCrea | G06F 19/3418 725/14 |
| 2014/0089116 A1* | 3/2014 | Argue | G06Q 10/0639 705/21 |
| 2014/0278896 A1* | 9/2014 | Anand | G06Q 50/01 705/14.32 |
| 2014/0280486 A1* | 9/2014 | Seay | H04L 67/10 709/203 |
| 2014/0282106 A1* | 9/2014 | Smith | G06F 17/30165 715/753 |
| 2014/0362024 A1* | 12/2014 | Hicks | G06F 3/167 345/174 |
| 2015/0006645 A1* | 1/2015 | Oh | H04L 65/1096 709/206 |
| 2015/0040198 A1* | 2/2015 | Gopalakrishnan | H04L 63/0492 726/5 |
| 2015/0046844 A1* | 2/2015 | Lee | G06F 3/0481 715/753 |
| 2015/0085058 A1* | 3/2015 | Zhang | H04N 7/142 348/14.02 |
| 2015/0142776 A1* | 5/2015 | Solheim | G06F 17/30011 707/722 |
| 2015/0169186 A1* | 6/2015 | Neven | H04L 67/10 715/751 |
| 2015/0195620 A1* | 7/2015 | Buchner | H04N 21/4788 725/141 |
| 2015/0373065 A1* | 12/2015 | Holmquist | H04L 65/403 715/753 |
| 2015/0373123 A1* | 12/2015 | Warrick | H04L 67/32 709/228 |
| 2016/0099970 A1* | 4/2016 | Grodzicki | H04W 12/0804 726/29 |
| 2016/0110526 A1* | 4/2016 | Abramson | H04L 63/06 705/59 |
| 2016/0165036 A1* | 6/2016 | Leow | H04L 67/306 455/557 |
| 2016/0182577 A1* | 6/2016 | Lipman | G06F 3/04847 715/753 |
| 2016/0202947 A1* | 7/2016 | Ramalingam | G02B 27/017 345/156 |
| 2016/0217397 A1* | 7/2016 | Peters | H04W 4/029 |
| 2016/0219057 A1* | 7/2016 | Das | H04L 63/101 |
| 2018/0004372 A1* | 1/2018 | Zurek | G06F 3/0484 |
| 2018/0136823 A1* | 5/2018 | Knoppert | G06F 3/04845 |
| 2019/0005479 A1* | 1/2019 | Glaser | G06Q 20/206 |
| 2019/0304216 A1* | 10/2019 | Mendelson | H04W 4/029 |

OTHER PUBLICATIONS

Mike Wu et al., "Gesture Registration, Relaxation, and Reuse for Multi-Point Direct-Touch Surfaces", Mitsubishi Electric Research laboratories (http://www.merl.com TR2005-109, IEEE Computer Socieity Order No. P2494, ISBN 0-7695-2494-X, pp. 183-190, Oct. 1, 2005.

US Patent Application entitled System and Method for Provisioning a User Interface for Scaling and Tracking by Michiel Knoppert et al. filed Nov. 16, 2016, 41 pages.

* cited by examiner

SYSTEM AND METHOD FOR PROVISIONING A USER INTERFACE FOR SHARING

BACKGROUND

Field of the Disclosure

This disclosure relates generally to information handling systems and more particularly to systems and methods for provisioning a user interface for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of information handling systems has increased in recent years. As the number and types of information handling systems increase, the types of user interfaces multiplies, which leads to suboptimal user experiences. Broadly speaking, user interface provisioning may be for a device, system, or apparatus. The user interface may be shown on a display device, such as a computer monitor.

SUMMARY

An information handling system provision or tier a user interface for one or more users. The user interface may provide a common scheme to other user interfaces previously seen by a user. The user interface, however, may be provisioned for interest and intent of the user, tiered for the type of information handling system, and adjusted based on the environment surrounding the information handling system. For example, a user may enter a building with an information handling system that anticipates the user as the user approaches. The user may view information previously gathered on a display and may share the information with a second user within the building.

The common scheme of the user interface may result in the user being familiar with the information presented or how to access the information presented. Thus, it may be desirable to use a user interface that maintains consistency and is provisioned or tiered for the particular circumstance. A user may not desire to share certain pieces of information with other users, in which case the information handling system may filter one or more user interface elements based on a policy. Moreover, the user may desire for certain information to be presented in different manners between different types of information handling systems. Thus, it may be desirable for the user to share content without concern for the manner of presentation.

In one aspect, a disclosed method for sharing user data comprises detecting a first user and a second user in proximity to an information handling system, the first user having been presented a first portion of content, display a user interface element associated with the content on the information handling system, sharing the user interface element with the second user, and presenting a second portion of the content on the information handling system to the second user. The content may be associated with the user interface element. The display of the user interface element may be based on the detection of the first user. The sharing of the user interface element may be based on a gesture received from the first user by the information handling system. The second portion of content may include the first portion of content and another portion of content.

In certain embodiments, the method may include initiating tracking of the user based on the first user accessing at least one of a web portal or an application. They method may include detecting an input from the second user. The input may be associated with the presented content, which may be associated with the shared user interface element. The method may include displaying by filtering the portion of content based on a privacy policy on the information handling system. The method may include detecting by determining whether a portable information handling system of the first user is communicatively coupled to the information handling system. The method may include matching a shared color scheme for the user interface element displayed on the information handling system with a first color scheme. The first color scheme for the user interface element may have been previously presented to the first user. The method may include sharing by receiving a voice of the first user from a pen and receiving a direction pointed to by the first user controlling the pen. The voice may be converted into a command for sharing the user interface element. The direction may correspond to the second user.

Another disclosed aspect includes an article of manufacture, comprising a non-transitory computer-readable medium storing instructions. The instructions may be executed by a processor.

A further disclosed aspect includes an information handling system, comprising a processor subsystem having access to a memory, the memory may store instructions executable by the processor subsystem.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
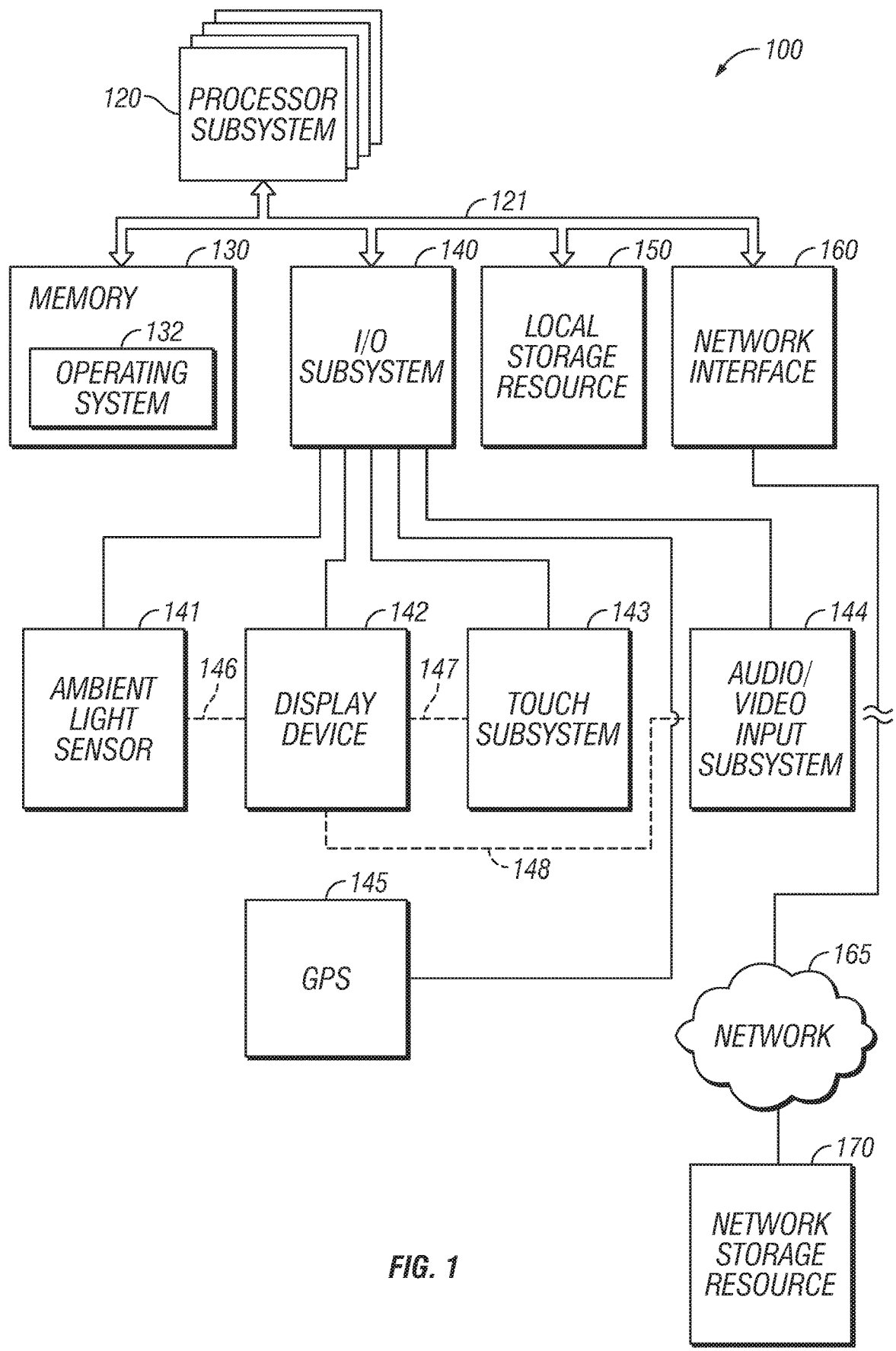
FIG. 1 is a block diagram of selected elements of an information handling system for user interface provisioning, in accordance with some embodiments of the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-8 wherein like numbers are used to indicate like and corresponding parts.

Turning now to the drawings, FIG. 1 illustrates a block diagram depicting selected elements of an information handling system 100 for user interface provisioning, in accordance with some embodiments of the present disclosure. Also shown with information handling system 100 are external or remote elements, namely, network 165 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 165. Network interface 160 may enable information handling system 100 to communicate over network 165 using a suitable transmission protocol and/or standard, including, but not limited to, transmission protocols and/or standards enumerated below with respect to the discussion of network 165. In some embodiments, network interface 160 may be communicatively coupled via network 165 to network storage resource 170. Network 165 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 165 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 165 and its various components may be implemented using hardware, software, or any combination thereof. In certain embodiments, information handling system 100 and network 165 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware not shown). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 165, which may use network interface 160. Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with display device 142 that is driven by display adapter (not shown).

I/O subsystem 140 may include one or more interfaces to other devices, which may be external to, or embedded within information handling system 100. For example, I/O subsystem 140 may be communicatively coupled to global positioning system (GPS) 145, which may obtain the location of information handling system 100. For example, GPS 145 may communicate or receive communication from one or more satellites to determine the position of the information handling system. In some embodiments, processor subsystem 120 may further determine the location of the information handling system via network 165. For example, network 165 may be a wireless LAN associated with a location. The location of the wireless LAN may be fixed, such as the location of a building, or may be variable, such as the location of a vehicle. Processor subsystem 120 may use the location of the wireless LAN to refine the location determined by GPS 145, or to determine the location of information handling system 100 more quickly than GPS 145 can determine the location of the information handling system.

As another example, I/O subsystem 140 may include display device 142, which may show or project a user interface for information handling system 100. The user interface may be represented by software, which may be part of operating system 132 or another application not shown. Display device 142 may access memory 130 to show or project a user interface.

A user may interact with information handling system 100 using display device 142. In one embodiment, information handling system 100 may include an ambient light sensor 141, which may measure the amount of light in the environment near information handling system 100.

Ambient light sensor 141 may be communicatively coupled to display device 142 via I/O subsystem 140, or may optionally be communicatively coupled directly to display device 142 via interface 146. Ambient light sensor 141 may be used by display device 142, I/O subsystem 140, and/or processor subsystem 120 to adjust the brightness and/or color temperature of display device 142. The brightness of display device 142 may refer to the intensity of light emitted from the display. Brightness may be measured in nits, lux, lumens, or any other suitable measure or perception of light intensity. For example, if ambient light sensor 141 measures an amount of light in the environment near information handling system 100 corresponding to a dim environment, display device 142 may be adjusted to a lower brightness to more closely match the light intensity of the surrounding environment. As another example, if ambient light sensor 141 measures an amount of light in the environment near information handling system 100 corresponding to a bright environment, display device 142 may be adjusted to a higher brightness to more closely match the light intensity of the surrounding environment.

In some embodiments, display device 142 may also adjust the color temperature of the display. Color temperature may refer to the color cast or hue, or an index of the color cast of display device 142. The index may represent a value on a color spectrum, which may be specified in units of Kelvin (K). A warm color temperature, such as 2000 K, may be similar to the light emitted by a candle or incandescent light bulb. Whereas a cool color temperature, such as 10000 K, may be similar to sunlight. For example, if ambient light sensor 141 measures an amount of light in the environment near information handling system 100 corresponding to a bright environment, display device 142 may be adjusted to a higher color temperature to more closely match human perception of the surrounding environment. A higher color temperature, which may also be known as a cool color temperature, may increase the intensity of blue light or reduce the intensity of red and/or green light that is emitted. Conversely, a lower color temperature, which may also be known as a warm color temperature, may increase the intensity of red and/or green light or reduce the intensity of blue light that is emitted. As another example, if ambient light sensor 141 measures an amount of light in the environment near information handling system 100 corresponding to a dim environment, display device 142 may be adjusted to a lower color temperature to more closely match human perception of the surrounding environment.

Touch subsystem 143 may be communicatively coupled to display device 142 via I/O subsystem 140, or may optionally be communicatively coupled directly to display device 142 via interface 147. Touch subsystem 143 may include a dedicated touch surface, or a touch surface embedded with display device 143. Touch subsystem 143 may detect user input from one or more points. In some embodiments, touch subsystem 143 may include the ability to detect pressure from a user, such as the pressure from a user resting one or more hands and/or one or more elbows on touch subsystem 143.

Audio/Video (A/V) input subsystem 144 may be communicatively coupled to display device 142 via I/O subsystem 140, or may optionally be communicate coupled direct to display device 142 via interface 148. A/V input subsystem 144 may include one or more audio and/or video inputs. For example, A/V input subsystem 144 may include one or more microphones. A microphone may detect nearby audio signals. The audio signals may be in proximity to the microphone, A/V input system 144, or any other suitable portion of information handling system 100, such as display device 142. In some embodiments, an array of microphones may provide directional audio capability. Directional audio capability may enable information handling system 100 to determine the location of a user or object producing sound. As another example, A/V input subsystem 144 may include one or more video cameras. In some embodiments, the video camera may be a three dimensional camera capable of determining the distance of an object from the camera, display device 142, or any other suitable part of information handling system 100.

The system bus may be system bus 121, which may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. A platform controller hub (not shown) may provide additional functionality for the processor subsystem 120. The platform controller hub may be internal or external to a processor in processor subsystem 120. The direct interface may be any suitable interface to enable communications, including but not limited to Direct Media Interface (DMI) or PCI-Express. Interfaces 146, 147, and 148 may be any suitable interface bus to provide communicative coupling, such as a Peripheral Component Interconnect Express (PCI-E) bus, Universal Serial Bus (USB), High-Definition Multimedia Interface (HDMI), or Video Electronics Standards Association (VESA) local bus, such as DisplayPort.

When a user of an information handling system enters a building associated with an interest of the user, another information handling system in the building may track the location and intent of the user. Another information handling system in the building may also provision a user interface customized to the tracking information of the user. The user interface may provide a common theme that is perceptibly the same as what the user has previously saw. The information handling system may scale the user interface to be tailored for the user. The information handling system may enable the user to share content or information with another user, in which the content is tiered or provisioned for the particular type of information handling system on which the other user views the content or information.

Figure 2:
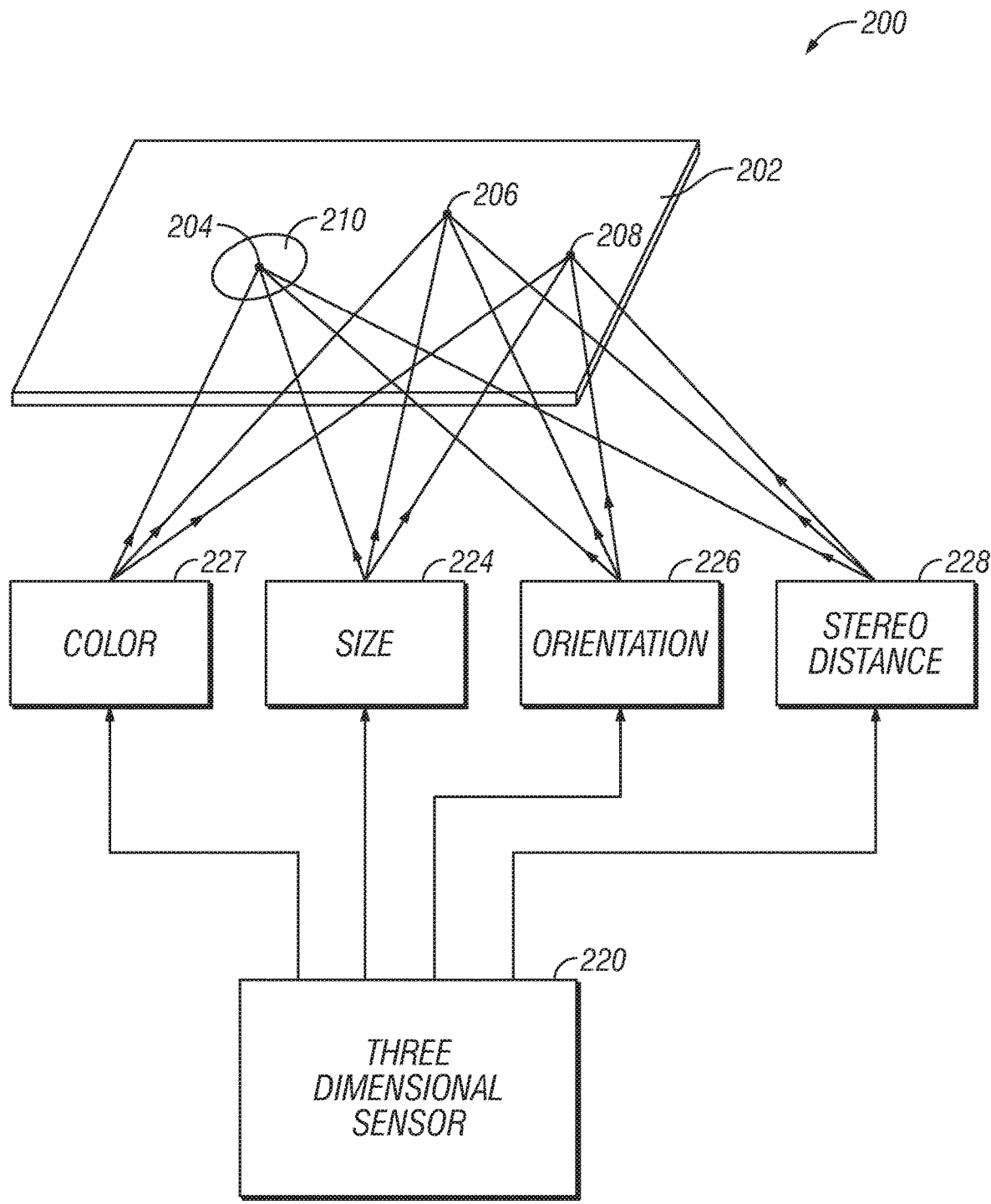
FIG. 2 is an illustration of selected elements of a three dimensional sensor for user interface provisioning, in accordance with some embodiments of the present disclosure.

Referring now to FIG. 2, an illustration of selected elements of a three dimensional sensor for user interface provisioning is shown in accordance with some embodiments of the present disclosure.

A three dimensional detector 220 may observe one or more points (204, 206, 208) among a map of locations 202. In some embodiments, detector 220 may include a plurality of sensors for three dimensional observation including but not limited to, CCD sensors, CMOS sensors, lasers, infrared filters, or one or more microphones. Observation of each point may include one or more pieces of information about the surrounding environment, including but not limited to spatial properties and object properties. Spatial properties include size 224, orientation 226, stereo distance 228, contrast, or luminance. Object properties include hue or color 222, shape, or texture. In some embodiments, detector 220 may be configured to evaluate each type of information in parallel. An information handling system using information from three dimensional detector 220 may enable the creation of a map of locations 202 and determination of which point one's attention should be focused.

Color 222 may include one or more colors, which may be evaluated in parallel. For example, red color information may be evaluated in parallel with the blue color information. Red color information may correspond to visible light in the range approximately between 620 nanometers (nm) and 750 nm. Blue color information may correspond to visible light in the range approximately between 450 nm and 495 nm. Color information may be sourced from one or more cameras capable of capturing at least a portion of the visible light spectrum.

Size 224 may evaluate the size or magnitude of an object. The size of an object may be estimated by using a camera capable of capturing visible light and/or infrared light. The camera may evaluate the size of an object relative to another object with a known size. In some embodiments, a laser may be used with the camera to display a series of intersecting lines in the camera's field of view. The camera may then further evaluate the size of the object relative to the size of the geometric shapes formed by the intersecting lines. To reduce or hide the presence of the intersecting lines, the laser and camera may project and detect infrared light, which is approximately in the wavelengths between 700 nm and 10,000 nm.

Orientation 226 may evaluate the positioning of an object. The orientation of an object may be inferred from the height, width, and depth of the object. In some embodiments, a laser may be used with the camera to collect the height, width, and depth of objects. For example, a laser may project a series of intersecting lines to provide information for a camera to observe. If the depth of an object is shallow, the object may not have a large volume. However, if the depth of the object is not shallow, the object may have a large volume.

Stereo distance 228 may evaluate how far an object is from three dimensional sensor 220, or any other suitable portion of an information handling system. Stereo distance 228 may be based on one or more inputs. For example, stereo distance 228 may be estimated based on the position of an object in two or more cameras separated by a defined distance. Each camera may capture the object positioned in a unique position. The difference between these unique positions may be used to determine the distance to the object. As another example, stereo distance 228 may be estimated based on one or more microphones separated by a defined distance and/or pattern. Each microphone may capture the sound produced by the object with a unique intensity. The difference between these intensities may be used to determine the distance and/or position of the object. As a further example, stereo distance 228 may be estimated with the use of two or more lasers and a detector. The laser may bounce a signal off of an object and the detector, which may be a camera, may detect the time required for the signal to return from an object. Each laser may capture the distance to the object from unique positions. The difference between these unique positions and distances may be used to determine the distance to the object. It will be appreciated that multiple types of inputs may be combined to provide the stereo distance information.

In some embodiments, the three dimensional sensor may be used to provide video recording, audio recording, distance measuring, light sensing, or gestures recognition. The three dimensional sensor may be used with one or more other sensors to detect and process data. For example, the three dimensional sensor may be used for videoconferencing, teleconferencing, object identification and tracking, ambient light sensing, or air gesture tracking.

Figure 3:
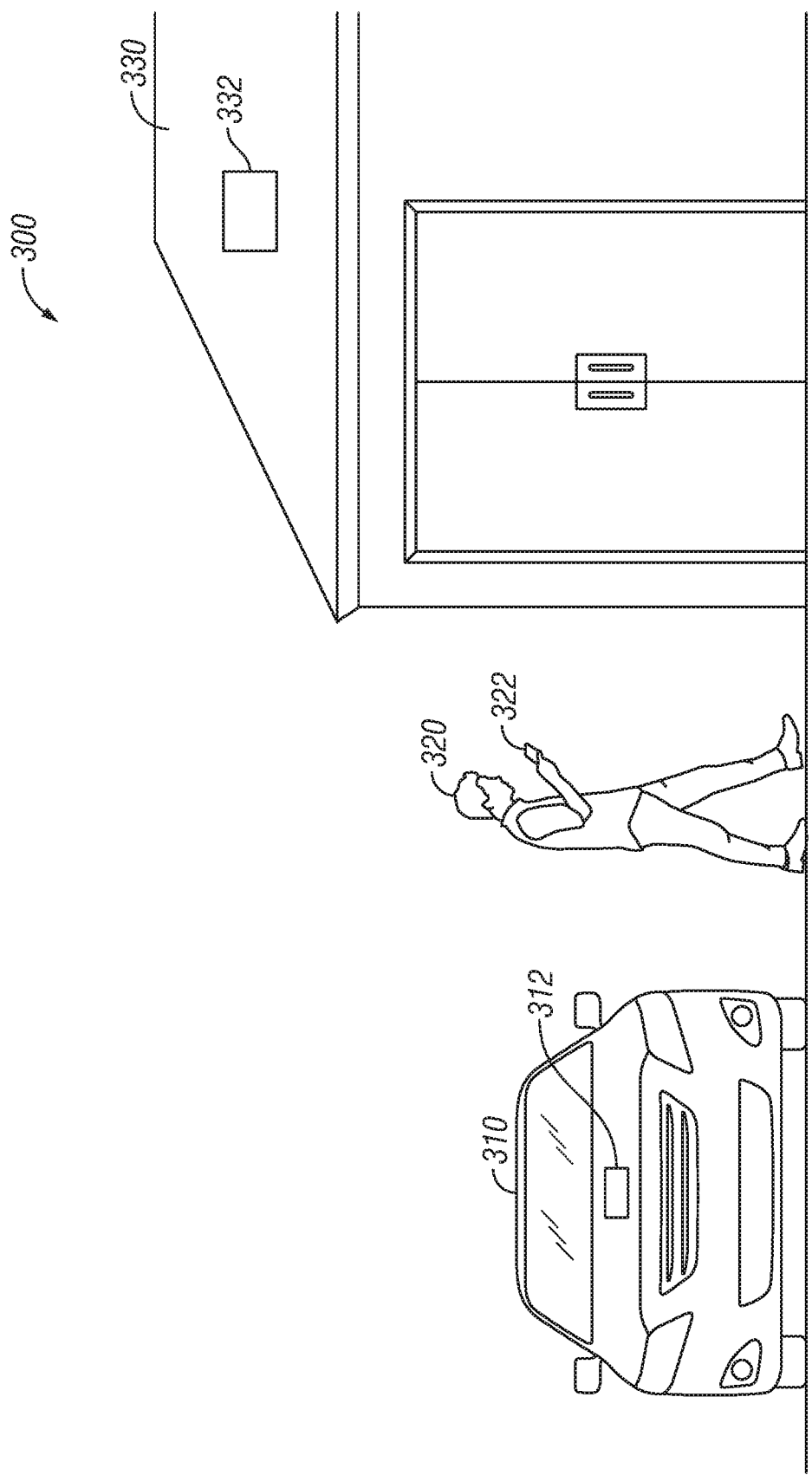
FIG. 3 is an illustration of selected elements for provisioning a user interface to scale and track in an outdoor environment, in accordance with some embodiments the present disclosure.

Referring now to FIG. 3, an illustration of selected elements for provisioning a user interface to scale and track in an outdoor environment is shown in accordance with some embodiments the present disclosure.

A user 320 may initiate tracking by using information handling system 322 to access a web portal, application, or other electronic medium associated with a product or service. The product or service may be offered at an associated brick and mortar location 330. Tracking may be initiated at any suitable location in which information handling system 322 has location tracking and/or network access. Information handling system 322 may be any type of device suitable for portable use, including but not limited to a smartphone, smartwatch, smart wearable, tablet, or laptop computer. From the initial access by user 320 to the brick and mortar location or building 330, the user experience may be aligned and scaled to provide user 320 with a cohesive presentation personalized for the particular information handling system as described in more detail below.

After initiating tracking, user 320 may walk toward or approach building 330. The mode of transportation 310 used to move user 320 from a remote location to a location near building 330 may include an information handling system, such as information handling system 312, to track user 320 upon approach. Information handling system 312 may be any type of device suitable for use during transportation, including but not limited to an embedded computer or a wireless network device. Although a vehicle is shown, any mode of transportation sufficient to move user 320 may be used. Information handling system 312 may be aware of the presence or proximity of user 320 via information handling system 322. For example, information handling system 322 may connect to a wireless network provided by information handling system 312. The wireless network may be of any suitable type for communication, including but not limited to Wi-Fi, Bluetooth, or Near Field Communications (NFC). As another example, information handling system 322 may share its location with information handling system 312.

When user 320 exits mode of transportation 310, information handling system 312 may notify an information handling system associated with building 330 that user 320 is approaching. The notification may be based on information handling system 322 disconnecting from communicative coupling with information handling system 312, or information handling system 322 sharing its location. In some embodiments, as user 320 approaches an information handling system, or a portion of an information handling system associated with building 330, information handling system 322 may notify an information handling system, or a portion of an information handling system associated with building 330 that user 320 is approaching. Information handling system 322 may determine whether user 320 is approaching by one or more sensors, including accelerometers or global position systems (GPS). For example, an accelerometer and GPS within information handling system 322 may identify the location of user 320 and determine that user 320 is approaching building 330, rather than, for instance, departing from building 330. As another example, an accelerometer may determine the walking pace of a user. If the user has a fast walking pace, information handling system 322 may determine that the user is in a rush.

In further embodiments, as user 320 approaches an information handling system, or a portion of an information handling system associated with building 330, information handling system 322 may communicatively couple to information handling system 332 in building 330. Information handling system 332 may be aware of the identity of user 320 based on the initiation of tracking by user 320. Information handling system 322 may connect with a network of other information handling systems, including but not limited to a cloud network or infrastructure, to determine whether user 320 previously initiated tracking. The network may include any suitable interface for connection with users including but not limited to, Wi-Fi, Bluetooth, or NFC. Based on information handling system 322 communicatively coupling to information handling system 332, the information handling system, or portion of the information handling system associated with building 330 may be able to determine that user 320 is about to walk in. If it is determined that user 320 previously initiated tracking, information handling system 322 or 332 may determine that the individual is an old or existing user. If it is determined that user 320 did not previously initiate tracking, information handling system 322 or 332 may determine that the individual is a new user.

When user 320 enters building 330, one or more microphones associated with information handling system 322 or information handling system 332 may use automated speech recognition to recognize and/or authenticate the identity of the user based on the voice of the user. If the voice of the user has an elevated volume, tone or pitch, information handling system 322 or 332 may determine that the user is in a rush.

Although certain operations of an information handling system are described, an information handling system may use a network of information handling systems of any suitable type, including but not limited to a cloud network or infrastructure, to assist or provide for the described operations.

Figure 4:
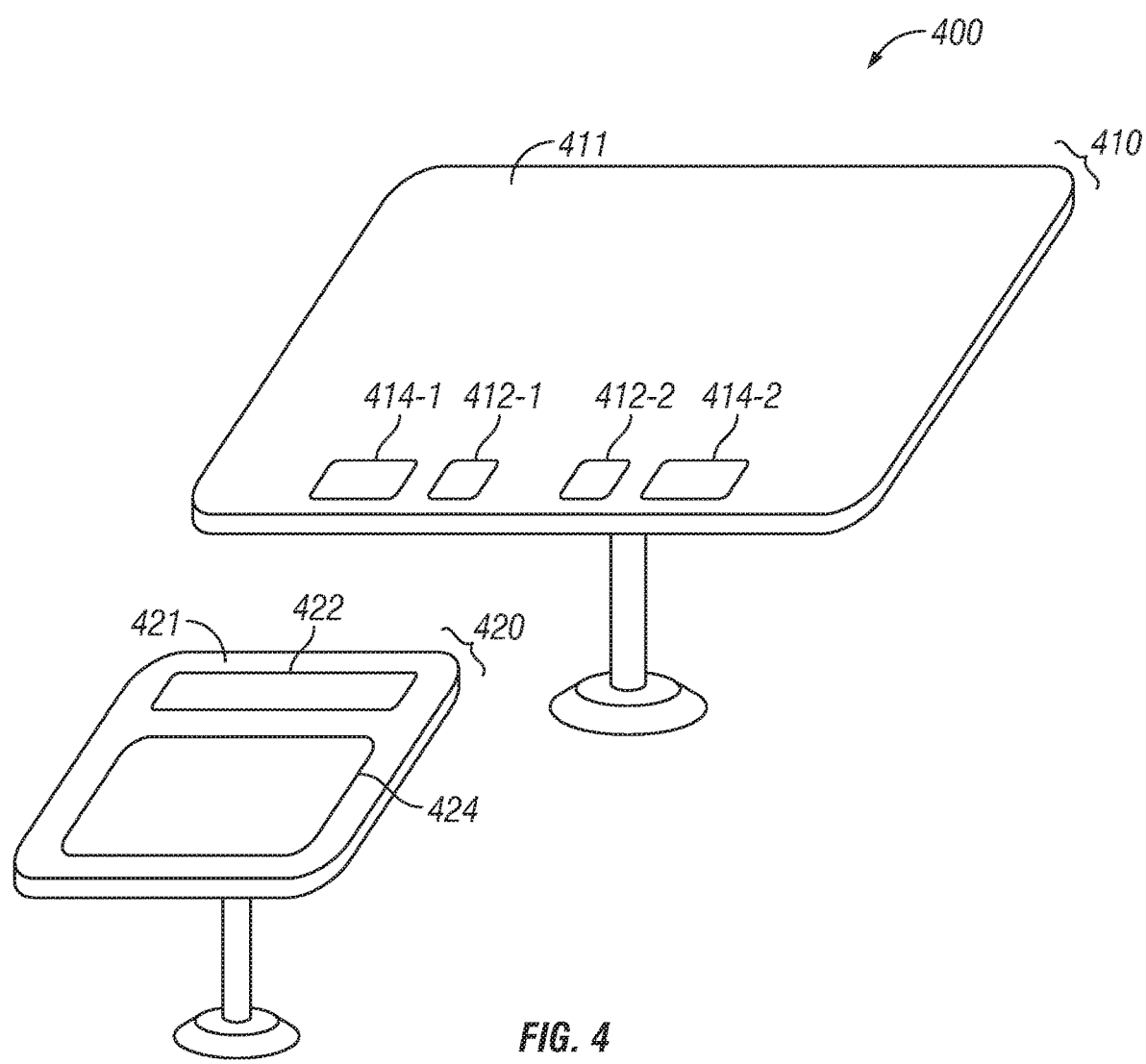
FIG. 4 is an illustration of a user interface provided to scale and track, in accordance with some embodiments of the present disclosure.

Referring now to FIG. 4 is an illustration of a user interface provided to scale and track is shown in accordance with some embodiments of the present disclosure.

Based on the identification or authentication of a user that enters a building, a system 400 may provide an interface for addressing the needs of the user. System 400 may include information handling system 410, which may be in the form of a desk, table, or other suitable surface for a user interface. Information handling system 410 may be connected to other information handling systems, such as information handling system 332, or may be an integrated information handling system, such as information handling system 332. Accordingly, information handling system 410 may have information about the user who entered the building.

The information about the user may include a variety of details, such as the previous tracking data of the user, when the user arrived at the location of system 400 (or the building in which system 400 resides), or whether the user is in a rush. The tracking data of the user may include information about one or more instances in which the user accessed data about a product or service. The tracking data may include details about the format of the data accessed, the date and time of the access, the duration of the access, the specific information that the user focused on during the one or more previous accesses, and the user details associated with the access, such as the user name, address, or account number. Although certain tracking information and data are described, any suitable tracking information may be used to provide information about the user to improve services to the user.

Information handling system 410 may include a display surface 411, which may be embedded into a piece of furniture. Display surface 411 may present one or more user interface elements, which may be viewed by an individual offering a product or service and by one or more individuals receiving, or interested in receiving, a product or service. For example, display surface 411 may present information about a first user and a second user. The information presented on each user may include an image of the user (412-1 and 412-2) and a brief description of the user (414-1 and 414-2). Although display surface 411 shows two users with each user having two pieces of information, any number of users and pieces of information may be presented sufficient to give an individual offering a product or service to the user an introduction to the one or more users.

The information displayed about the user may be enabled by the user data tracking, which may have been previously initiated by the user. The source of the data may be information the user manually entered or information the user provided from another source, such as a social media service. In one embodiment, the information displayed about the user may be visible to both the person providing the product or service, and each of the users. In another embodiment, the information displayed about the user may be visible only to the person providing the product or service. In a further embodiment, the information displayed about the user may be visible to the person offering the product or service and the user associated with the information, but not any other user. The visibility of the information may be controlled by the font size, contrast, color and/or hue of the text displayed, or by the angle at which the users may view the display. For example, a smaller font size is harder to read from a distance than a larger font size. As another example, the contrast of the text may be lowered to reduce the ability for another user to see information, which may be considered private or secure. As the contrast of the text is reduced, the text may become more difficult to discern over the reflections of light on display surface 411.

The user interface elements shown on the display of the information handling system may be tiered or provisioned based on a local policy, which may define what content is public or private. If the information handling system determines that a portion of content is private, the information handling system may filter out the portion of content or the associated user interface elements from what is displayed. Alternatively, another information handling system may perform the filtering and prevent the portion of content or the associated user interface elements from being transmitted to the information handling system.

If one or more users initiated user data tracking, the information presented on display device 411 may appear to be similar to the information previously displayed to the user when user data tracking was initiated. The foreground and/or background may be similar in color, shape, pattern, orientation, curvature, motion, and/or depth as the foreground and/or background previously displayed to the user. In an embodiment, image 412-1 of the user and brief description 414-1 may be similar to what was previously shown to the user. The image of the user 412-1 may include a shape and/or color similar to shapes previously shown to the user. For example, if the user accessed an application or website using a portable information handling system, such as a smartphone, and the application or website previously presented the user with a circular view of the user's image, image 412-1 may also include a circular view. As another example, the border of the user's image may be blue, which may match the blue border of the user's image as presented to the user previously. The brief description of the user 414-1 may include text using a particular font and/or layout. For example, if the user accessed an application or website using another information handling system and the application or website previously presented to the user a particular font, brief description 414-1 may also use the particular font to present text. As another example, the brief description of the user 414-1 may show three pieces of information: the date on which the user became a user, what products or services are of particular interest to the user, and the user's existing accounts associated with any products or services. The user may have seen the same three pieces of information, with the same level of detail.

In addition to information handling system 410, an individual offering a product or service to a user may have a separate information handling system 420, which includes a separate display surface 421. Display surface 421 may be smaller, equal in size, or larger than display surface 411. Although a separate information handling system 420 is shown, display surface 421, in some embodiments, may be communicatively coupled to display surface 411 without the use of a separate information handling system. Display device 421 may include information about one or more users. The information presented on display device 421 may not be visible to other users. Accordingly, confidential information may be displayed on display device 421. For example, display device 421 may present an overview of users 422 and/or 424, and a detailed view of user 424. The detailed view of the user may include information about the products or services received by the user, or the products or services that the user may be interested in. In some embodiments, the detailed view of the user may further include information about the user such as the account history, credit history, social security number, phone number, address, birthdate, or personal identification number (PIN) associated with the user.

Figure 5:
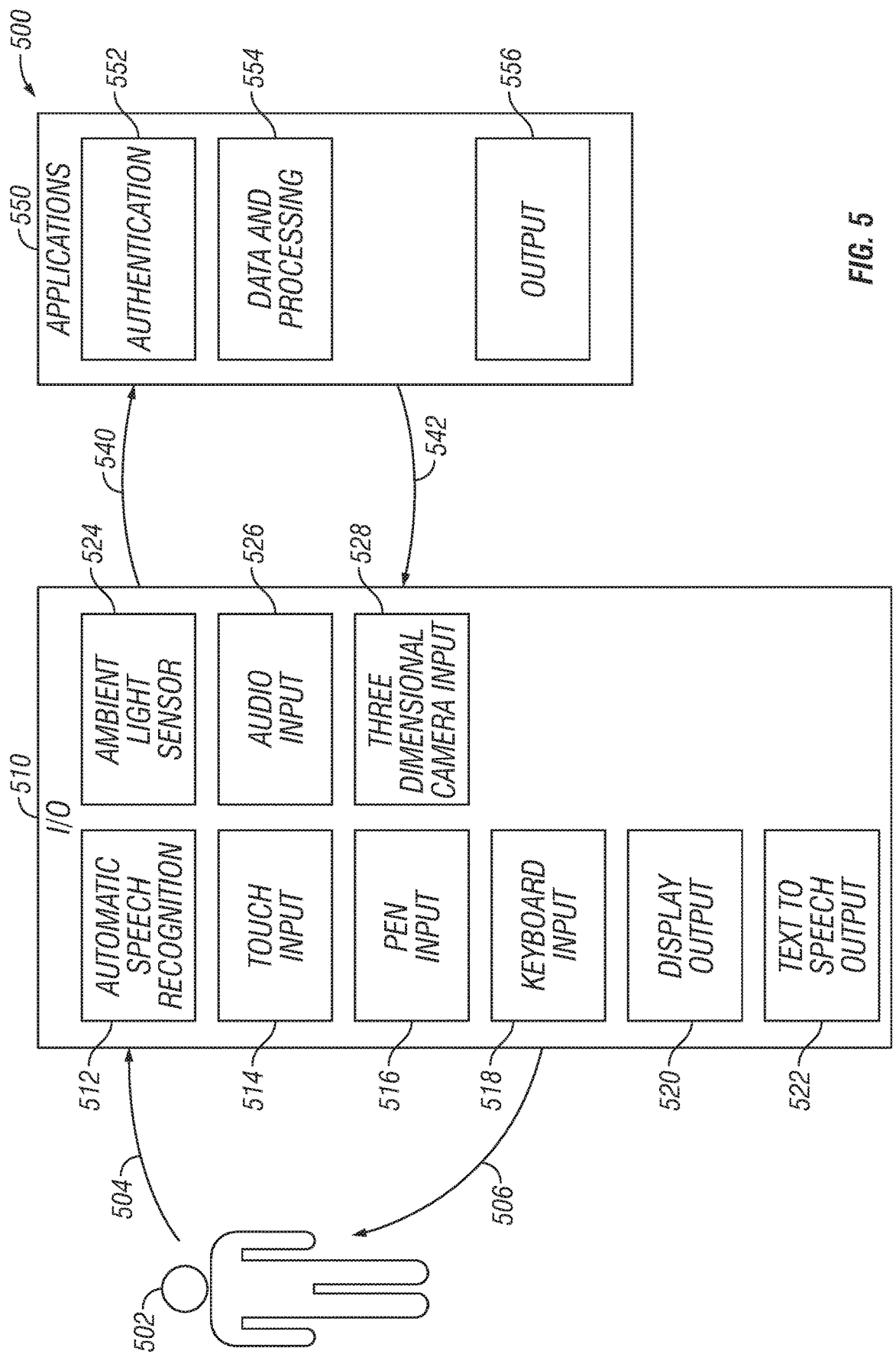
FIG. 5 is a block diagram of an information handling system with a user interface provisioned with scaling, tracking, and sharing, in accordance with some embodiments of the present disclosure.

Referring now to FIG. 5 is a block diagram of an information handling system with a user interface provisioned for scaling, tracking, and sharing is shown in accordance with some embodiments of the present disclosure. System 500 may include a user 502, I/O 510, and applications 550.

User 502 can provide communication via interface 504 to one or more inputs in I/O 510. Those inputs are processed and/or sent via interface 540 to one or more applications 550. Applications 550 may send an output via interface 542 to one or more outputs in I/O 510, which may send the output via interface 506 to the user 502.

I/O 510 may include one or more inputs for automated speech recognition 512, touch input 514, pen input 516, keyboard input 518, ambient light sensor 524, audio input 526, or three dimensional camera 528. I/O 510 may also include one or more outputs for display output 520 or text to speech output 522.

Automated speech recognition 512 may receive one or more audio streams as an input and may process those audio streams to generate text. Automated speech recognition 512 may process the audio streams in any suitable location, including a local information handling system, a remote or networked information handling system, such as a cloud network or infrastructure, or any suitable combination thereof. Automated speech recognition 512 may employ an enrollment or training procedure for frequent users to improve the accuracy of speech recognition. Automated speech recognition 512, for example, may utilize neural networks to learn from previous speech recognitions based on whether the recognized text was accurate. Automated speech recognition 512 may support the detection and transcription of multiple languages, or it may ask a user or system administrator to select a language.

Touch input 512 may include a touch controller for processing signals received from a touch device. Touch input 512 may be associated with a resistive or capacitive touch device, which is capable of receiving input from the finger, hand, palm, arm, or elbow of a user. Touch input 512 may process the signals from a touch device to determine the intent of a user. For example, a user may provide a gesture with one finger to select an object, a gesture with two fingers to scroll down a list or resize an object, and a gesture with three or more fingers or a hand to switch views on a display. Switching views on a display may be useful when switching from one task to another. For example, a user may wish to open a bank account and obtain a loan. The user may switch from a view associated with opening a bank account to a view associated with obtaining a loan by using three or more fingers or a hand in a gesture. As another example, a user may use a hand or palm to signal an intent to view information more closely. Touch input 512 may detect a hand or palm leaning on a display and inform an application controlling display output 520. Display output 520 may be modified in response to the touch input 512 detect a hand or palm leaning on the display. For example, display output 520 may, in response, increase the size of the text or objects to provide the user with more detail. As another example, display output 520 may move one or more objects toward the user. As a further example, display output 520 may expand the graphical user interface for the user to provide more details about a product or service for the user.

Pen input 516 may receive signals from a pressure sensitive or capacitive layer on a surface or display or an electronic pen. The pen may be used to draw, move, or modify text, objects, or files. In some embodiments, the pen may include an audio input device, such as one or more microphones, to record the voice of a user. The user may use the audio input device to allow pen input 516 to interface with automated speech recognition 512 to convert the voice of the user into text. The user may use the electronic pen to direct the text generated by automated speech recognition 512 by pointing to a specific location on a display, such as a textbox.

Keyboard input 518 may receive signals from a keyboard or other typing input device. Keyboard input 518 may be used to enter user information. For example, a user may enter a personal identification number or social security number for verification purposes. Alternatively, a user may use their fingerprint, voice, or eyes for authentication. As another example, a user may enter their contact information to be associated with their user profile or account.

Display output 520 and text to speech output 522 may output information to user 502 via interface 506. Display output 520 may interface with one or more display controllers or display devices to provide the user with a visual representation of information. The display output 520 may be controlled by an application, such as output application 556. In some embodiments, output application 556 may be a graphics display driver or software application. Text to speech output 522 may receive text from applications 550, convert the text to audio, and provide audio feedback to user 502 via a speaker or some other audio output device. Interface 506 may include any suitable medium for output, including but not limited to a display device or audio output device. Ambient light sensor 524 may measure the amount of light in the surrounding environment, as described in more detail in FIG. 1. Audio input 526 may include input from one or more microphones. Three dimensional camera 528 may provide video and depth sensing capabilities as described in more detail in FIG. 2.

Applications 550 may include an authentication application 552, data and processing application 554, and output application 556. Authentication or identity verification in authentication application 552 may include any suitable form of authentication or verification of user 502, including but not limited to an audio signature or a visual signature. An audio signature may require user 502 to speak their name or some other predefined word or phrase. The voice of user 502 may be received by automatic speed recognition 512, which may convert the voice into text for authentication application 552. Alternatively, the voice of user 502 may be received by authentication application 552, which may compare a signature of the voice to a prerecorded signature associated with the voice of user 502. A visual signature may include a written signature, a fingerprint, a face, or an eye. The written signature may be recorded by an electronic pen or a camera. The fingerprint may be recorded with a fingerprint sensor. The face may be recorded by a camera that feeds one or more pictures into a facial recognition application. The eye may be recorded with a three dimensional sensor or camera, or an iris scanner. In some embodiments, authentication may require more than one signature.

Data and processing application 554 may include software to receive tracking data and input data and process the received data for output application 556. Data and processing application 554 may receive tracking data from an information handling system and input data from I/O 510 including but not limited to, audio input, text generated by automated speech recognition 512, touch input 514, pen input 516, keyboard input 518, ambient light sensor 524, audio input 526, or three dimensional camera 528. Data and processing application 554 may process the received data in a way suitable to respond to an input. In one embodiment, the data and processing application 554 may identify a user or the intent of a user with location tracking data, user travel details, and the voice of a user. The location tracking data may include association with wireless access points or a series of global position system (GPS) coordinates. The user travel details may include data from an accelerometer that may be embedded in the vehicular or portable information handling system. The voice of a user may be received by an audio recording device, such as a microphone. The user or user intent may be identified by one or more portions of location tracking data, user travel data, or user voice data.

In another embodiment, the data and processing application 554 may identify the content and color previously presented to user 502. Based on that identification, data and processing application 554 may direct output application 556 to adapt the display for user 502, in which the display maintains a common set of content and color with the information previously presented to user 502. A common set of content may include any user interface interpreted by a user in a unified manner, including a comment set of shapes, text, or information. A common set of color may include a common color scheme across the user interface on a plurality of information handling systems for user 502.

In a further embodiment, data and processing application 554 may lock or restrict movement of data which may be sensitive in nature from display to other users or the public. User 502 may tag data as sensitive, or data and processing application 554 may determine what types of data are sensitive based on automatic tagging of data based on one or more rules. If a user requests to view data on another information handling system or display, data and processing application 554 may restrict or prevent the sensitive data from being transferred to, or displayed on the other information handling system or display. For example, a user may gesture for their data to be displayed or shared with another user. Data and processing application 554 may receive the gesture from I/O 510 and filter the data to be displayed or shared based on the level of sensitivity associated with each portion of the data. The level of sensitivity may enable the user to share some sensitive information with a defined list of individuals while preventing access to other sensitive information.

Figure 6:
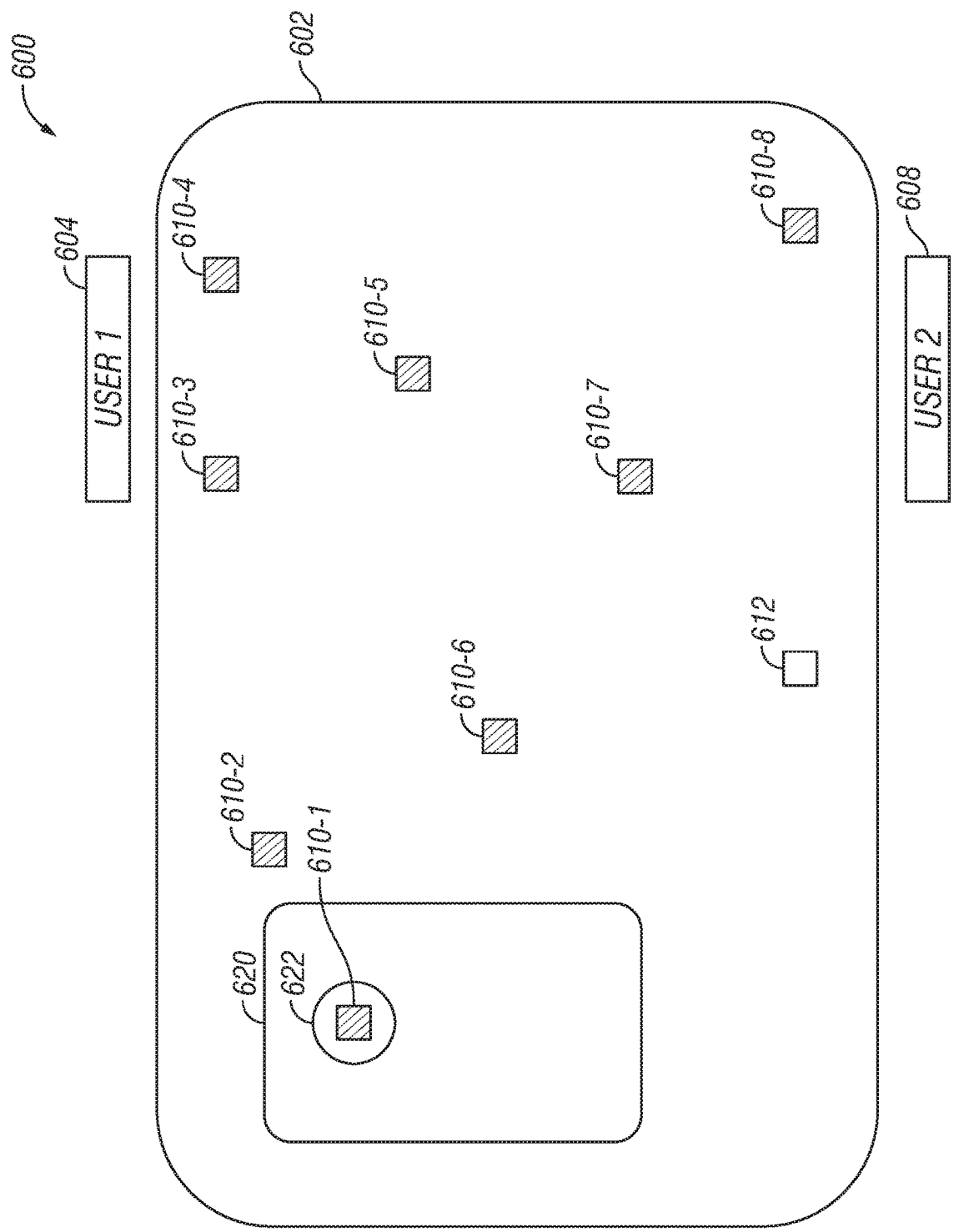
FIG. 6 is an illustration of an information handling with a user interface provisioned with scaling, tracking, and sharing, in accordance with some embodiments of the present disclosure.

Referring now to FIG. 6 is an illustration 600 of an information handling system 602 with a user interface provisioned with scaling, tracking, and sharing is shown in accordance with some embodiments of the present disclosure.

Information handling system 602 may provide a display for one or more users. Users 604 and 608 may be located on opposite sides of information handling system 602 as shown. Although two users are illustrated, any number of users may be supported by information handling system 602 for scaling, tracking, user interaction, and/or sharing. The display of information handling system 602 may include a plurality of user interface elements. One or more user interface elements 610 may share a common color, such as red. One or more other user interface elements may have a different color than user interface elements 610. For example, user interface element 612 may include the color green. In one embodiment, user interface elements 610 may be associated with user 604 and user interface element 612 may be associated with user 608. In some embodiments, users 604 or 608 may use a pen to direct input. The pen may include one or more devices for directing input. For example, the pen may include a microphone to record a user's voice and an interface to automated speech recognition to translate the voice of the user into text. As another example, the pen may include a sensor to tag the location of the tip of the pen to determine precisely where the pen is pointed.

Information handling system 602 may identify a user as a primary visual search owner based on an action of the user. For example, user 604 may begin to speak or may continue to speak with an elevated tone or intensity. As another example, user 604 may gesture toward the display of information handling system 602. In some embodiments, a user, such as an individual offering a product or service, may be assigned to be a master user, who may control which user is the primary visual search owner by selecting the appropriate user. As a further example, user 604 may move closer to information handling system 602, which may respond by identifying user 604 the primary visual search owner.

Information handling system 602 may identify visual search zone 620 to denote the region of the display where the primary visual search owner may operate. A visual search zone may narrow the attention of a user to a select region of display or a particular collection of user interface elements. Information handling system 602 may identify the visual search zone with any input suitable for locating an area of interest on the display. For example, a user may use a pen which includes a sensor for tagging the location pointed to by the pen. Information handling system 602 may receive input from the pen to determine where it is pointed to identify the visual search zone.

User 604 may dictate text to the pen, and direct the pen to a location on the display of information handling system 602 to identify a visual search zone. The information handling system 602 may receive the dictation, convert it to text using automated speech recognition, and place the text within the visual search zone. In one embodiment, the text may be placed in a textbox. In another embodiment, the text may be placed in a file, which may be depicted by an icon within the visual search zone. The icon may be placed in an optimal location based on the direction of the user.

A user may also select user interface elements within a visual search zone. Information handling system 602 may notify user 604 of visual search zone 620, which may also be referred to as a click zone, to direct the attention of the user. User 604 may then select user interface element 610-1 by placing a highlight 622 over the element. User 604 may highlight element 610-1 using information handling system 602 with any suitable device, including a pen to tap on the element, a finger to touch the element, or an eye-tracking scanner to track where the eyes are directed.

After highlighting user interface element 610-1, user 604 may perform a variety of actions. The information associated with the user interface element may be any suitable data type for displaying or sharing, including but not limited to a data file, such as a chart or video, or an executable file. For example, user 604 may select further exploration of user interface element 610-1, which may include opening a data file associated with the element or executing a file associated with the element. As another example, user 604 may move user interface element 610-1 to user 608, who may be the intended recipient of the information associated with the element. User 604 may direct the movement of the element via a gesture including but not limited to, the swipe of a finger, the shuffling of a hand toward another user in the air or along a surface, or the pointing of a pen toward another user. If a data file is associated with the element, the presentation of the data file may differ from one type of information handling system to another. For example, if user 604 has a user interface element associated with a movie file on a portable information handling system, the movie file may be presented in a simplified form on the portable information handling system, such as an audio file without a video. When user 604 shares the user interface element associated with the movie file with user 608, user 608 may be able to playback a video on the display of information handling system 602, in which the video includes audio similar to the audio file available on the portable information handling system of user 604.

Figure 7A:
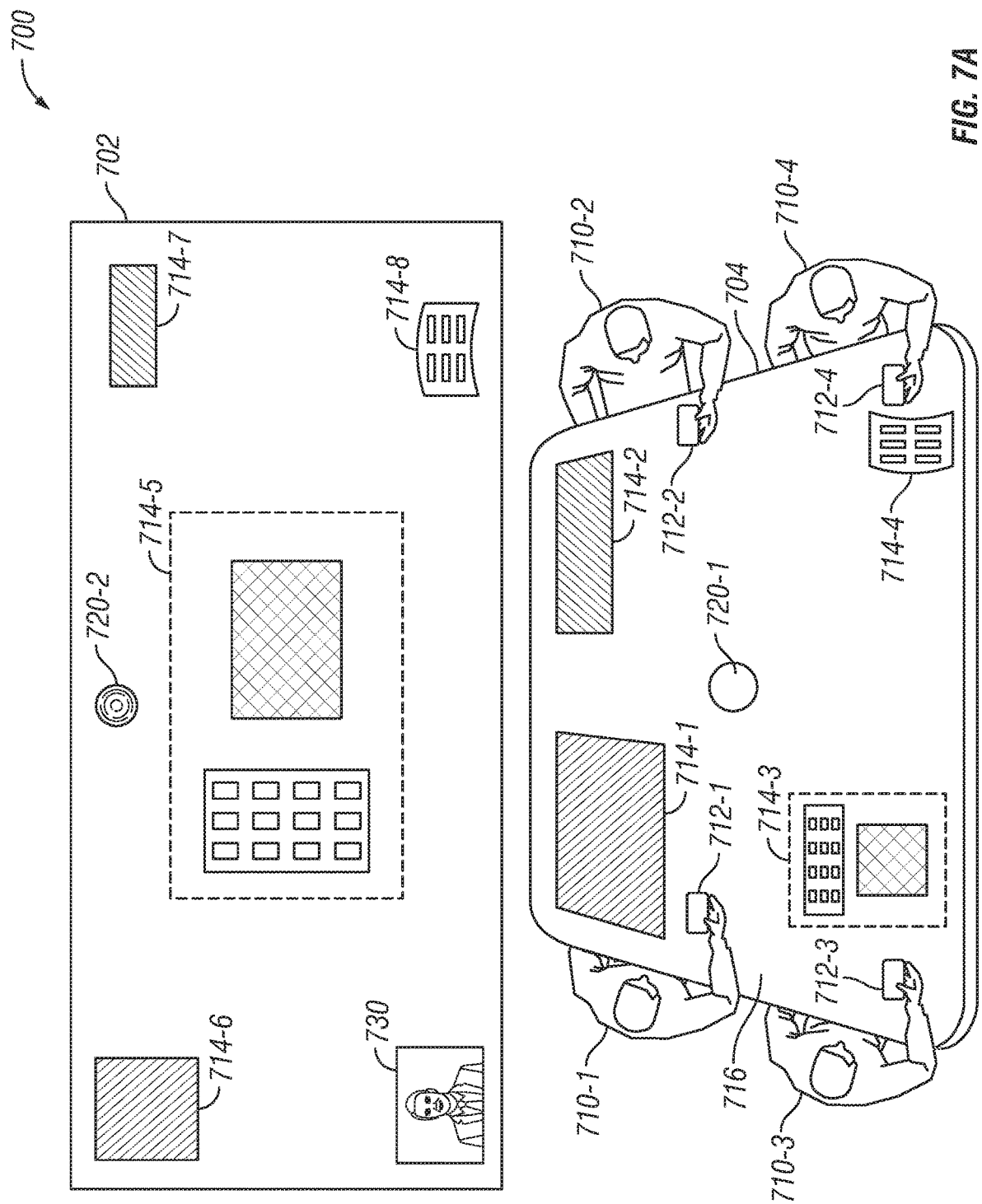
FIG. 7A is an illustration of a system with user interfaces provisioned with scaling, tracking, and sharing, in accordance with some embodiments of the present disclosure.

Referring now to FIG. 7A is an illustration of a system 700 with user interfaces provisioned with scaling, tracking, and sharing is shown in accordance with some embodiments of the present disclosure.

System 700 may include a plurality of information handling systems, such as information handling systems 702, 704, and 712. Information handling system 702 may include a display or projection of an image on a vertical surface, such as a wall. Information handling system 704 may include a display device embedded in a horizontal surface, such as a table. System 700 may interact with a plurality of users 710. Each user may have a portable information handling system 712, such as a smartphone or tablet computer. Across information handling system 702, 704, and 712, system 700 may provide for scaling of the user interface and tracking of user information and user intent. The content may be shown in perceptibly the same manner between the information handling systems. This perception may be achieved with common colors, shapes, patterns, orientations, curvatures, motions, and/or depths. Although three types of information handling systems are shown, system 700 may include any number and type of information handling systems suitable for providing scaling of the user interface and tracking of user information and user intent.

As noted above, system 700 may interact with a plurality of users 710. In at least one embodiment, one or more of these users may be referred to as an individual offering a product or service, or a master user. Although four users are shown, system 700 may support any number of users. Each of the users 710 may have unique user information, tracking, and/or intent. User 710-1, for example, may have a portable information handling system 712-1. User 710-1 may have previously used portable information handling system 712-1 to access a web portal or portable application to initiate user tracking or to enter user information, such as the name and contact information of the user or the products or services that interest the user. Information handling system 712-1 may transmit the user tracking or user information to information handling system 702 or 704. In one embodiment, the transmission may be direct using a wired or wireless interface, such as Wi-Fi, Bluetooth, or NFC. In another embodiment, the transmission may be to another information handling system, which may be part of a network, where the other information handling system transmits the user tracking or information to information handling system 702 or 704.

When user 710-1 approaches information handling system 704, information handling system 704 may detect that user 701-1 is in proximity to information handling system 704 and, in response, display user interface element 714-1 for user 710-1. User interface elements 714 may include any suitable number of objects including but not limited to, toolbars, status bars, child windows, tables, or charts. Each of the objects may include unique colors, sizes, shapes, textures, orientations, and/or fonts. Information handling system 704 may detect the proximity of user 701-1 using one or more sensing devices, including but not limited to a three dimensional sensor 720-1 or 720-2, or a touch sensor embedded in the display of information handling system 704. Information handling system 704 may share user interface element 714-1 for user 710-1 by displaying user interface element 714-6 on the display of information handling system 702. System 700, or any information handling system within system 700 may maintain the same perceptible color, shape, pattern, orientation, motion, and/or depth between user interface element 714-1 and user interface element 714-6. For example, system 700 may modify the size of user interface element 714-6 to match the perceived size of user interface element 714-1. If user interface element 714-6 is further away from user 710-1 than user interface element 714-1, system 700, or any information handling system within system 700 may increase the size of mirrored user display element 714-6 to match the perceived size of user display element 714-1. Information handling system 702 and/or 704, for example, may use a three dimensional sensor 720 to determine the distance from user 710-1 to the display of information handling system 704 and/or the distance from user 710-1 to the display of information handling system 702. The distances between objects may be used to adjust the size of user interface elements to more closely match between displays. Accordingly, user 710-1 may perceive the size of user interface element 714-1 to the same as user interface element 714-6.

If a plurality of users project content on the display of information handling system 702, one of the user's content may be promoted. In one embodiment, the content of the primary visual search owner may be promoted. In another embodiment, the content to be promoted may be controlled by a particular user, such as a master user. In a further embodiment, the content promoted may represent the content most recently requested to be displayed. A user may request for content to be displayed by using a gesture on the display surface of information handling system 702 or 704, an air gesture in the vicinity of information handling system 702 or 704, or a gesture by a pen or other electronic writing device. The gestures may be detected by a sensor communicatively coupled to information handling system 702 or 704. The sensor may be any suitable device, including but not limited to a touch sensor for finger, hand, arm, or electronic device input, and a three dimensional sensor for gestures in the air or gestures using the eyes.

The promoted content may be larger than content displayed by other users. In one embodiment, user interface elements that are promoted may be enlarged to occupy more space on the display of information handling system 702. In another embodiment, user interface elements that are not promoted may be compressed to occupy less space on the display of information handling system 702. In a further embodiment, user interface elements that are promoted may be enlarged and user interface elements that are not promoted may be compressed. User interface 714-6, for example, may not be promoted and may be compressed to occupy less space on the display of information handling system 702 than the perceived equivalent size of user interface element 714-1. Accordingly, user 710-1 may perceive that user interface element 714-1 is larger than 714-6, which is not promoted.

The display of information handling system 702 may also shift the color of the user display elements and the brightness of the display using a sensor, such as three dimensional sensor 720-2 or an ambient light sensor (not shown). If the sensor detects a bright room, the display of information handling system 702 may be shifted toward a higher color temperature, such as blue. If the sensor detects a dim room, the display of information handling system 702 may be shifted toward a lower color temperature, such as red or yellow. The colors shown on the display of information handling system 702 may also be shifted in response to the brightness detected by the sensor such that user 710-1 may perceive the colors used for user interface element 712-1 to be appreciably identical to the colors used for 714-6. Accordingly, the colors used for user interface element 714-6 may not be precisely identical to the colors used for user interface element 714-1 if the lighting is different between information handling systems 702 and 704.

Similar to user 710-1, users 710-2 and 710-4 may have portable information handling systems 712-2 and 712-4 for initiating user tracking. Users 710-2 and 710-4 may cause user interface elements 714-2 and 714-4 to be shown on the display of information handling system 702 by approaching information handling system 704 or by leaning on the display of information handling system 704. User interface elements 714-2 and 714-4 may be shared on the display of information handling system 702, as shown by user interface elements 714-7 and 714-8. User interface elements 714-7 and 714-8 may have the same perceptible color, shape, pattern, orientation, motion, and/or depth as user interface elements 714-2 and 714-4.

In comparison to users 710-1, 710-2, and 710-4, user 710-3 may be promoted to share content using a larger portion of the display of information handling system 702. User 710-3 may have a portable information handling system 712-3 for facilitating user tracking. User interface element 714-3 may include a plurality of content. For example, the content may include a table of options and a pie chart showing the details of a selected option. User interface element 714-3, which may be shown on the display of information handling system 704, may be mirrored on the display of information handling system 702 as user interface element 714-5. User interface element 714-5 may be larger than other user interface elements on the display of information handling system 702.

In some embodiments, information handling system 702 may include a video display user interface element 730, which may show a video with a remote user. The remote user may display and share content in a manner similar to local users 710. The remote user may see local users 710 using a camera, such as a three dimensional camera, and may hear the local users 710 using one or more microphones. In some embodiments, the microphones may be aligned in an array, which may enable system 700, or an information handling system within system 700 to identify which local user 710 is talking. The content of the loudest user, for example, may be promoted on the display of information handling system 702 or the display of the information handling system of a remote user.

Figure 7B:
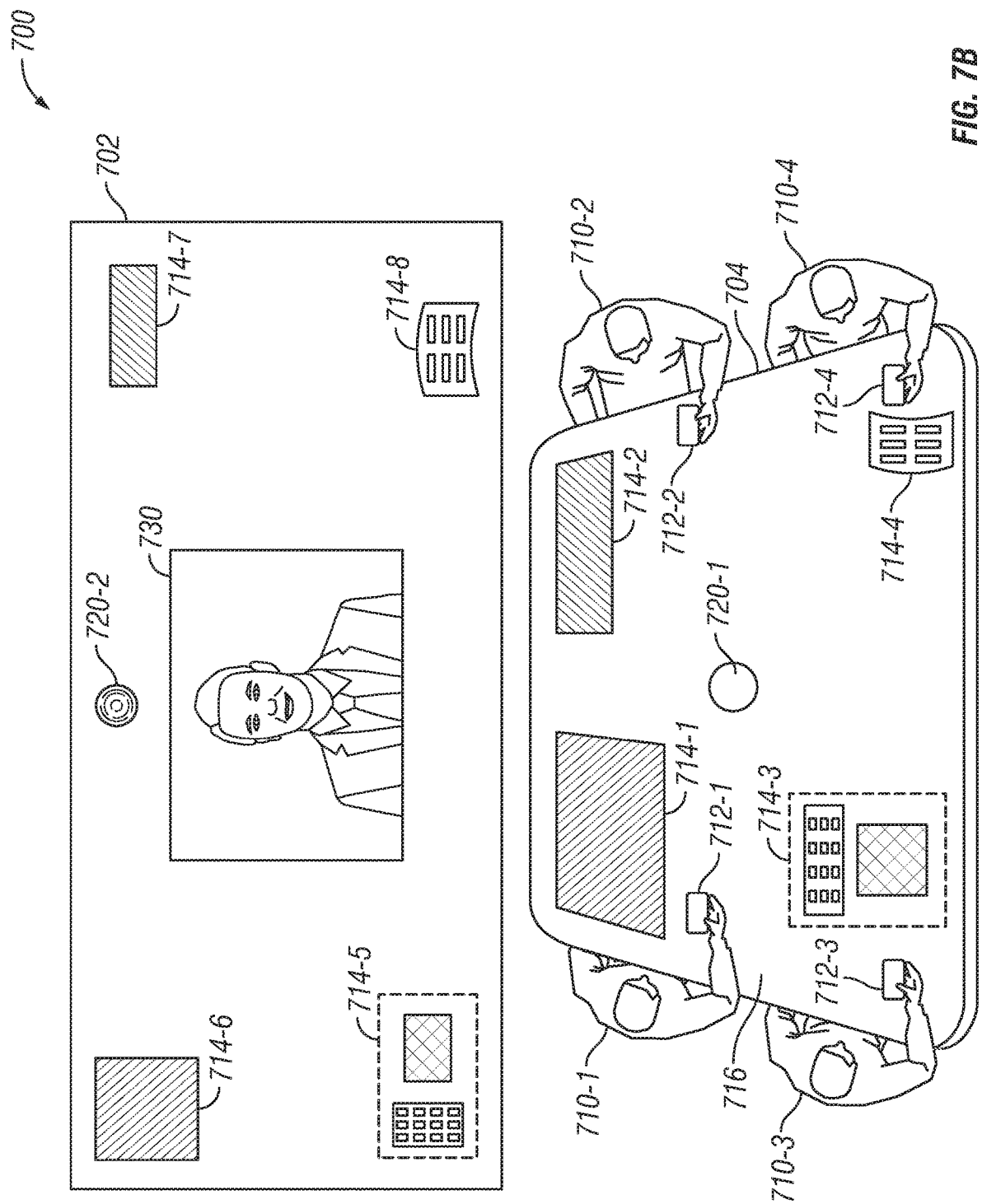
FIG. 7B is an illustration of a system with a video conference provisioned for scaling, tracking, and sharing, in accordance with some embodiments of the present disclosure.

Referring now to FIG. 7B is an illustration of a system 700 with a video conference provisioned for scaling, tracking, and sharing is shown in accordance with some embodiments of the present disclosure. FIG. 7B may be similar to FIG. 7A, and include provisioning for scaling, tracking, and sharing during a video conference. Users 710-1, 710-2, 710-3, and 710-4 may be of different heights. For example, user 710-1 may be the shortest user, while user 710-2 may be significantly taller than user 710-1. System 700 may determine the heights of the users 710 using three dimensional sensor 720-1 or 710-2. System 700 may adjust the positioning and size of video display user interface element 730 based on the heights of the users 710. For example, if all of the users are short, such as below five feet in height, system 700 may lower the position of video display user interface element 730 on the display of information handling system 702. As another example, system 700 may increase the size of video display user interface element 730 to be larger than the other elements on the display of information handling system 702. The size may be based on the distance of users 710 from the display of information handling system 702. The size may increase if the individual in video display user interface element 730 begins to speak, or may decrease if the individual in video display user interface element 730 mutes their microphone. Video display user interface element 730 may be larger than user interface elements 714 on the display of information handling system 702.

Figure 8:
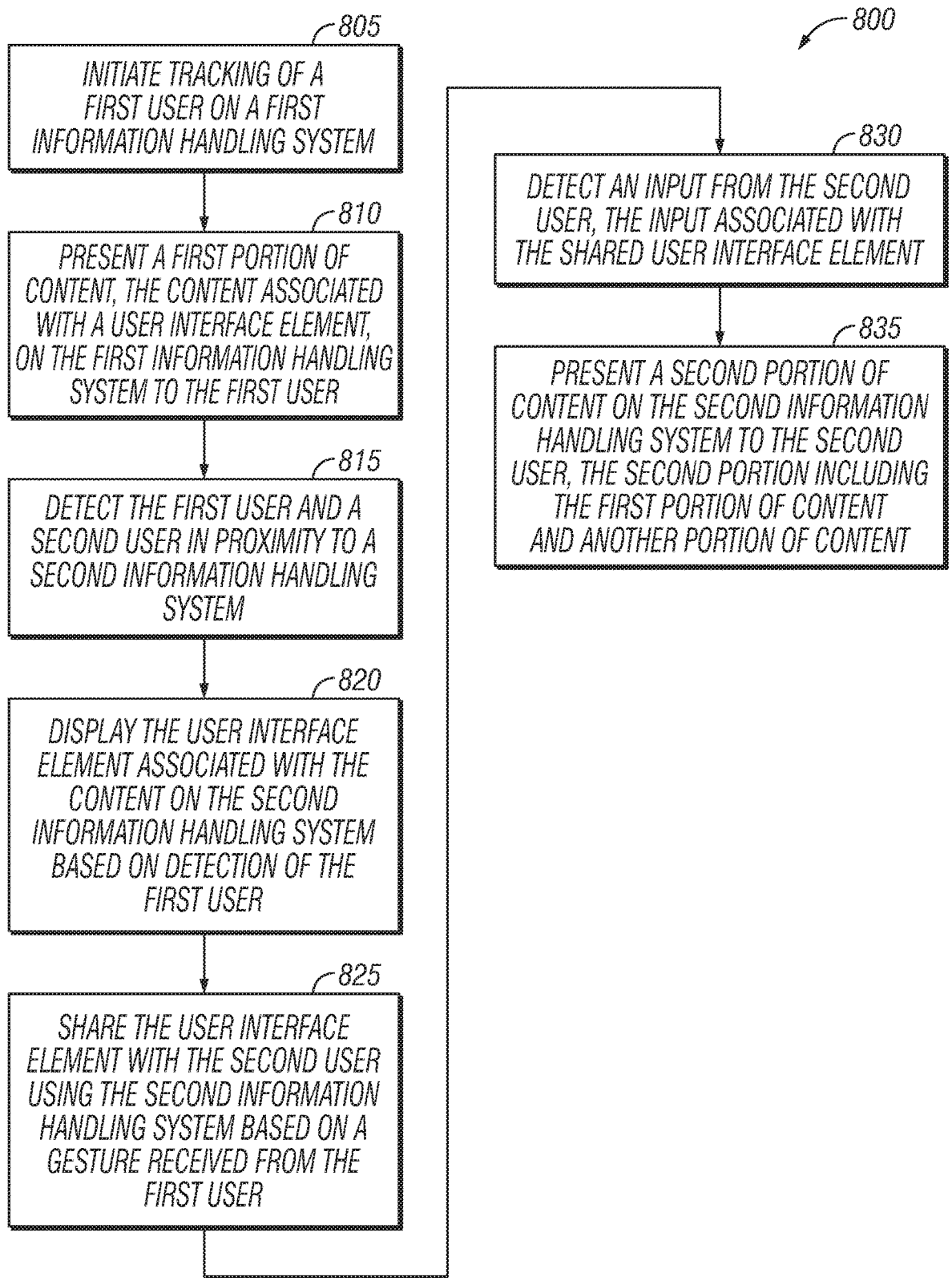
FIG. 8 is a flow chart depicting selected elements of a method for provisioning a user interface of an information handling system for sharing, in accordance with some embodiments the present disclosure.

Referring now to FIG. 8 is a flow chart depicting selected elements of a method for provisioning a user interface of an information handling system using sharing is shown in accordance with some embodiments the present disclosure. Method 800 may be implemented by any of the elements shown in FIGS. 1-7. Method 800 may be initiated by any suitable criteria and may initiate operation at any suitable point. In one embodiment, method 800 may initiate operation at 805. Method 800 may include greater or fewer actions than those illustrated. Moreover, method 800 may execute its steps in an order different than those illustrated in FIG. 8. Method 800 may terminate at any suitable point. Furthermore, method 800 may repeat operation at any suitable point. Method 800 may perform any of its actions in parallel with other actions of method 800, or in other methods.

At 805, tracking of a first user may be initiated on a first information handling system. The first information handling system may be a portable device, such as a smart wearable device, a smartphone, or a tablet computer. Tracking may be initiated automatically by the first user browsing a particular web portal, or by using an application on the first information handling system, or may be initiated manually by the first user agreeing to a contract, such as a terms of service agreement. Tracking may enable the first information handling system, or other information handling systems, such as those connected via a network, to follow the actions and interests of the first user.

At 810, a first portion of content may be presented to the first user on the first information handling system. The content may be associated with a user interface element. For example, the content may be a movie and the first portion of the content may be the audio portion of the movie. The first information handling system may present the audio my playing back the sound to the first user. The first portion of the content may be selected using any suitable criteria, including selection of a portion of the content to simplify viewing on a particular type of display or information handling system, or to reduce the power consumption associated with the presentation of the content.

At 815, the first user and a second user may be detected in proximity to a second information handling system. The second information handling system may be located in a public location, or a semi-public location in which the second user may view at least a portion of the content. An information handling system may determine a user to be in proximity using one or more sensors or interfaces. For example, a user may be carrying a first information handling system, which connects to a network associated with the second information handling system, or connects directly with the second information handling system. Accordingly, the second information handling system may detect the user as being in proximity. As another example, the second information handling system may include a camera and facial recognition to identify or detect the user.

At 820, the user interface element associated with the content may be displayed on the second information handling system based on the detection of the first user. The user interface element may be displayed with a common look and feel to the element displayed to the first user on the first information handling system. A common look and feel may include a similar color, shape, pattern, orientation, curvature, motion, and/or depth. For example, the color may be similar or in common between the two displays of the information handling systems. The color white may correspond to a particular interest of the user, such as the desire of the user to open a bank account. The color pink may correspond to another interest of the user, such as the desire of the user to deposit a check. Although white and pink are described, any color that may be associated with a product, service, or interest of the user may be used. As another example, the shape and orientation may be similar or in common between the two displays of the information handling systems. The user may be presented with an object with a rectangle shape, which may be oriented such that the width of the shape is greater than the length of the shape. Accordingly, a horizontally oriented rectangular object may be shown on the display of the first information handling system and the display of the second information handling system.

A user interface element may be scaled for the display of the second information handling system using any suitable criteria to maintain a consistent user experience including, but not limited to scaling the element based on the size of the display, the density of pixels on the display, the type of information handling system, or the distance of the user from the display, which may be measured by a three dimensional camera or at least one microphone.

The user interface element shown on the display of the second information handling system may be tiered or provisioned based on a local policy, which may define what content is public or private. If the second information handling system determines that the content, or a portion of the content is private, the second information handling system may filter out private information, including an associated user interface element, from what is displayed. Alternatively, another information handling system may perform the filtering and prevent the content, or the portion of content from being transmitted to the second information handling system. The other information handling system may be any system with the local policy information, including but not limited to the first information handling system or a remote information handling system.

At 825, the user interface element may be shared on the second information handling system with the second user based on a gesture received from the first user. In one embodiment, the gesture may be along the surface of the display of second information handling system. In another embodiment, the gesture may be in the air in the vicinity of the second information handling system. In a yet another embodiment, the gesture may be made using a pen or other electronic writing device. The gestures may be detected by a sensor communicatively coupled to the second information handling system. The sensor may be any suitable device, including but not limited to a touch sensor for finger, hand, arm, or electronic device input, or a three dimensional sensor for detecting gestures made in the air or using the eyes.

At 830, an input from the second user may be detected by the second information handling system. The input may be associated with the user interface element shared by the first user. The input may be a gesture, which may be similar to the gesture used by the first user to share the user interface element, or may be a user input action, such as the press of a key on a keyboard or the click of a button on a mouse.

At 835, a second portion of the content may be presented on the second information handling system to the second user. The second portion of content may include the first portion of content and another portion of content. For example, the second portion of content may be a movie, which includes the first portion of content, such as an audio stream, and another portion of content, such as a video stream. The presentation of the movie may include playing back the movie to the second user. Although a movie with an audio stream and a video stream is described, the first portion, second portion, and other portion of content may be any subset of content sufficient for the first information handling system or second information handling system.

Method 800 may optionally repeat or terminate.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for tracking and sharing user data, comprising:
    initiating tracking of a first user in response to the first user having initially accessed from a first information handling system at least one of: a web portal or an application, the first user having been presented a first portion of content based on the first user access, the content associated with a user interface element;
    detecting the first user and a second user in proximity to a second information handling system, the first user detected based on receipt, by the second information handling system, a notification from the first information handling system and identification of the first user tracked since the first user initially accessed from the first information handling system at least one of: the web portal or the application, wherein:
        the tracking of the first user is initiated when the first information handling system is located remote to the second information handling system; and
        the first user is detected when the first information handling system is located proximate to the second information handling system;
    displaying the user interface element associated with the content on the second information handling system based on the detection of the first user;
    sharing the user interface element with the second user based on a gesture received from the first user by the second information handling system; and
    presenting a second portion of content on the second information handling system to the second user, the second portion including the first portion of content and another portion of content.

2. The method of claim 1, further comprising detecting an input from the second user, wherein the input is associated with the presented content that is associated with the shared user interface element.

3. The method of claim 1, wherein displaying the portion of content on the second information handling system comprises filtering the portion of content based on a privacy policy on second the information handling system.

4. The method of claim 1, wherein detecting the first user in proximity to the second information handling system comprises determining whether a portable information handling system of the first user is communicatively coupled to the second information handling system, wherein the portable information handling system is the first information handling system.

5. The method of claim 1, further comprising matching a shared color scheme for the user interface element displayed on the second information handling system with a first color scheme for the user interface element previously presented to the first user.

6. An article of manufacture comprising a non-transitory computer-readable medium storing instructions, that, when executed by a processor, cause the processor to:
   initiate tracking of a first user in response to the first user having initially accessed from a first information handling system at least one of: a web portal or an application, the first user having been presented a first portion of content based on the first user access, the content associated with a user interface element;
   detect the first user and second user in proximity to a second information handling system, the first user detected based on receipt, by the second information handling system, a notification from the first information handling system and identification of the first user tracked since the first user initially accessed from the first information handling system at least one of: the web portal or the application, wherein:
      the tracking of the first user is initiated when the first information handling system is located remote to the second information handling system; and
      the first user is detected when the first information handling system is located proximate to the second information handling system;
   display the user interface element associated with the content on the information handling system based on the detection of the first user;
   share the user interface element with the second user based on a gesture received from the first user by the information handling system; and
   present a second portion of the content on the information handling system to the second user, the second portion including the first portion of content and another portion of content.

7. The article of manufacture of claim 6, further comprising instructions that cause the processor to detect an input from the second user, wherein the input is associated with the presented content that is associated with the shared user interface element.

8. The article of manufacture of claim 6, wherein the instructions that cause the processor to display the portion of content on the second information handling system comprise instructions that cause the processor to filter the portion of content based on a privacy policy on the second information handling system.

9. The article of manufacture of claim 6, wherein the instructions that cause the processor to detect the first user in proximity to the second information handling system comprises instructions that cause the processor to determine whether a portable information handling system of the first user is communicatively coupled to the second information handling system, wherein the portable information handling system is the first information handling system.

10. The article of manufacture of claim 6, further comprising instructions that cause the processor to match a shared color scheme for the user interface element displayed on the second information handling system with a first color scheme for the user interface element previously presented to the first user.

11. The article of manufacture of claim 6, wherein the instructions that cause the processor to share the user interface element with the second user based on a gesture received from the first user by the second information handling system comprise instructions that cause the processor to:
   receive a voice of the first user from a pen, the voice converted into a command for sharing the user interface element; and
   receive a direction pointed to by the first user controlling the pen, the direction corresponding to the second user.

12. An information handling system comprising:
   a processor subsystem having access to a memory subsystem, wherein the memory subsystem stores instructions executed by the processor subsystem, that, when executed by the processor subsystem, cause the processor subsystem to:
      initiate tracking of a first user in response to the first user having initially accessed from a portable information handling system at least one of: a web portal or an application, the first user having been presented a first portion of content based on the first user access, the content associated with a user interface element;
      detect the first user and second user in proximity to an information handling system, the first user detected based on receipt, by the information handling system, a notification from the portable information handling system and identification of the first user tracked since the first user initially accessed from the portable information handling system at least one of: the web portal or the application, wherein:
         the tracking of the first user is initiated when the portable information handling system is located remote to the information handling system; and
         the first user is detected when the information handling system is located proximate to the portable information handling system;
      display the user interface element associated with the content on the information handling system based on the detection of the first user;
      share the user interface element with the second user based on a gesture received from the first user by the information handling system; and
      present a second portion of the content on the information handling system to the second user, the second portion including the first portion of content and another portion of content.

13. The information handling system of claim 12, further comprising instructions that cause the processor to detect an input from the second user, wherein the input is associated with the presented content that is associated with the shared user interface element.

14. The information handling system of claim 12, wherein the instructions that cause the processor to display the portion of content on the information handling system comprise instructions that cause the processor to filter the portion of content based on a privacy policy on the information handling system.

15. The information handling system of claim 12, wherein the instructions that cause the processor to detect the user in proximity to the information handling system comprises instructions that cause the processor to determine whether the portable information handling system of the first user is communicatively coupled to the information handling system.

16. The information handling system of claim 12, further comprising instructions that cause the processor to match a shared color scheme for the user interface element displayed on the information handling system with a first color scheme for the user interface element previously presented to the first user.

17. The information handling system of claim 12, wherein the instructions that cause the processor to share the user interface element with the second user based on a gesture received from the first user by the information handling system comprise instructions that cause the processor to:
   receive a voice of the first user from a pen, the voice converted into a command for sharing the user interface element; and
   receive a direction pointed to by the first user controlling the pen, the direction corresponding to the second user.

* * * * *